United States Patent Office 3,098,827
Patented July 23, 1963

3,098,827
DEMULSIFICATION OF PETROLEUM OIL EMULSIONS
Willard H. Kirkpatrick, Sugar Land, and Virgil L. Seale, Alice Walker and Robert E. Law, Houston, Tex., assignors to Nalco Chemical Company, a corporation of Delaware
No Drawing. Filed Mar. 31, 1958, Ser. No. 724,809
16 Claims. (Cl. 252—341)

This invention, in general, relates to new compositions of matter having surface-active properties used in the breaking or demulsification of water-in-oil petroleum emulsions.

Petroleum emulsions are, in general, of the water-in-oil type wherein oil is the continuous phase and the discontinuous or dispersed phase comprises finely-divided particles of naturally occurring waters or brines. These emulsions are often extremely stable and will not resolve into the oil and water components even on long standing. The emulsions obtained from producing wells and from the bottom of crude oil storage tanks are commonly referred to as "cut oil," "emulsified oil," "bottom settlings" and "B.S." It is also to be understood that water-in-oil emulsions may occur artificially, resulting from any one or more of numerous operations encountered in various industries. Desalting, wherein water and oil are mixed to dissolve in the water the water-soluble salts contained in the oil to remove the same from the oil, is an example of an operation in which an emulsion may result during the processing of the oil.

One phase of the instant invention relates to the treatment of emulsions of the water-in-petroleum oil type to the action of a demulsifying agent of the type hereinafter described. The demulsifying agent causes the emulsion to resolve or break into its component parts of water and oil, and the component parts will thereafter stratify into separate layers of water and petroleum oil upon standing in a relatively quiescent state.

One type of process involves the resolution of crude oil emulsions of the water-in-oil type wherein the dispersed phase is water or brine. These emulsions are found in many recovered crude oils. The treatment ordinarily involves the addition of the emulsion-breaking chemical to the recovered crude oil, and the resolving of the water and oil into separate phases. The temperatures of treatment are often atmospheric temperatures, although in most instances, where it is feasible, it is desirable to heat the emulsion to facilitate the separation into the two phases.

Still another type of process involves the use of a demulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5% to 10% of fresh water is added to the crude oil charge stock and emulsified therein by means of a pump or through a differential pressure valve. A demulsifying agent is added and the treated oil permitted to stand in a quiescent state for relatively short periods of time allowing the salt-laden water to stratify, whereupon it is bled off to waste resulting in 90% to 98% removal of salt content. This operation is carried out continuously as contrasted with batch treating.

In desalting operations where petroleum emulsions are created artifically and then broken, the conditions employed are usually quite different from those used in breaking water-in-oil petroleum emulsions at the well. The temperatures may range from 160° F. to 350° F. and are preferably around 190° F. to 210° F. The pressures are those which are developed by heating under autogenous pressures and may be, for example 215 to 250 pounds per square inch gauge. The time of heating is subject to variation but is usually around 15 to 30 minutes. Since a refinery unit may handle up to 50,000 barrels of oil per day and the amount of salt present may be, for example, 15 pounds to 250 pounds of salt per thousand barrels of oil, it will be appreciated that the separation of this salt is very important, especially since it is usually desired to reduce the salt content of the oil by at least 90%.

It is, accordingly, an object of our invention to provide new and useful processes for resolving water-in-petroleum oil emulsions into their component parts of petroleum oil and water or brine.

Another object is to provide new and useful processes for resolving water-in-petroleum oil emulsions into their component parts of petroleum oil and water or brine with surface-active chemicals comprising dicarboxy acid esters of a plural number of polyhydroxy compounds, at least one of which is an oxyalkylated partial ester of a monocarboxylic acid and pentaerythritol or higher condensation derivatives thereof such as dipentaerythritol and tripentaerythritol, which esters are substantially free of unreacted carboxy groups.

A still further object is to provide new and useful processes for resolving water-in-petroleum oil emulsions into their component parts of petroleum oil and water or brine with surface-active mixed esters which are especially suitable as demulsifying agents for water-in-petroleum oil emulsions. Other objects will appear hereinafter.

The surface-active compounds of the instant invention are, broadly speaking, dicarboxylic acid esters of one or more different polyhydroxy compounds, at least one of which is an oxyalkylated partial ester of monocarboxylic acids and pentaerythritol and/or condensation derivatives thereof such as dipentaerythritol and tripentaerythritol. The dicarboxylic acid is substantially completely esterified and the ultimate ester contains few, if any, free carboxy groups. The ratio of oxyalkylated partial ester of pentaerythritol to the other polyhydroxy components is at least 1:4 on a weight basis where such other polyhydroxy compounds are employed. The other polyhydroxy compounds are organic compounds having a molecular weight of at least 1,000 and having at least one, preferably at least two, of the hydroxy groups terminally positioned on polyoxyethylene adduct chains. The adduct nucleus is a high molecular weight, hydrophobic organic compound having a molecular weight of 900 and preferably having a molecular weight over 900. Examples of such oxyethylated compounds are oxyethylated polyoxypropylene glycols, the polyoxypropylene glycol nucleus having a molecular weight of 1,000 or more; polyoxyethylene, polyoxypropylene glycols wherein the ratio of oxyethylene to oxypropylene does not exceed 4:1; oxyalkylated castor oil; polyoxypropylene adducts of polyamines such as ethylene diamine, diethylene triamine, triethylene tetramine, propylene diamine-1,2, and the like, which adducts are terminally oxyethylated; polyoxypropylene adducts of polyhydric alcohols such as ethylene glycol, glycerol, propylene glycol, and the like, which adducts are terminally oxyethylated; oxyethylated or oxypropylated, oxyethylated phenol-formaldehyde or phenol-formaldehyde-polyamine resins having 4–15 phenolic nuclei; mixed polyoxyethylene, polyoxypropylene adducts of the foregoing amino or hydroxy compounds; and other high molecular weight compounds having at least two reactive groups such as hydroxyl, amino or carboxy which can be oxyalkylated. The compounds are oil-soluble and exhibit surface-active properties making them suitable as emulsion breakers or demulsifiers.

PENTAERYTHRITOL COMPOSITIONS

These compositions are prepared by first partially esterifying pentaerythritol or polypentaerythritols with a monocarboxylic acid or mixtures of monocarboxylic acids. The mol ratio of acid to pentaerythritol or polypentaerythritols is such that at least one hydroxyl group of the latter compounds are esterified and two hydroxyl groups remain unreacted. With pentaerythritol, itself, the preferred ratio is about 1.5 to 2.0 mols of acid per mol of pentaerythritol. For best results, the resulting partial ester should be a liquid at temperatures in the range of 125° C. and above, and it is preferred that the partial ester so produced be a liquid product at room temperature.

The partial esterification is carried out under substantially anhydrous conditions in a reaction vessel having a return condenser system permitting the removal of any moisture introduced with the reagents and also the removal of the water of reaction formed during the esterification period. The esterification, preferably, is carried out in a suitable organic solvent, such as a hydrocarbon extract, at temperatures above about 200° C. in the presence of a small, catalytic amount of alkaline catalyst such as sodium hydroxide or calcium hydroxide.

Pentaerythritol is a tetra-hydroxy alcohol having four methylol groups on a central carbon. According to the Geneva system of nomenclature, it is 1,3 dihydroxy-2,2 di-methylol-propane. Polypentaerythritols are condensation ethers of pentaerythritol having the general formula:

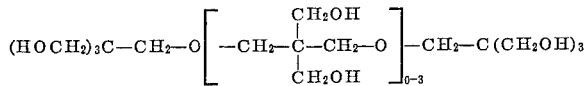

The plural term "pentaerythritols," when it appears in the appended claims, is intended to encompass both pentaerythritol itself and the previously described polypentaerythritols.

The preferred monocarboxylic acids are resin acids, fatty acids having at least 12 carbons and not more than 36 carbons, or mixtures of resin acids and fatty acids such as occurs in tall oil. Tall oil is a by-product from the production of wood pulp and consists largely of resin acids and fatty acids. Abietic acid is the major resin acid, and the fatty acids are chiefly $C_{18}$ unsaturated acids.

Fatty acids per se which are suitable for purposes of the instant invention include lauric, myristic, palmitic, stearic, arachidic, behenic, myristoleic, palmitoleic, oleic, linoleic and linolenic acids. The acid employed in the esterification may be a single one of any of the aforesaid acids or mixtures of such acids derived from natural origins or other admixtures. Typical mixtures of fatty acids which may be so employed include distilled tall oil fatty acids, tallow fatty acids, soybean oil fatty acids, linseed oil fatty acids, menhaden oil fatty acids, etc.

After the partial esterification, the intermeditae partial esters are then oxyalkylated with either propylene oxide or mixtures of ethylene oxide and propylene oxide in ratios of 1:9 to 9:1, respectively. In the latter instance, the ethylene oxide and propylene oxide may be mixed prior to reaction with the partial ester—thus forming a heterogeneous arrangement of ethylene oxide and propylene oxide residue in the oxyalkylene chain—or the propylene oxide may be added first, after which the ethylene oxide is reacted with the oxypropylated product. In general, the oxyalkylation reactions may be carried out between temperatures of 125° C.–175° C. Most reactions proceed smoothly in the range of 140° C.–165° C. The compounds so produced should be of high molecular weight, in no case less than 1,000 and preferably 1,500–2,000 or more.

In the production of compounds suitable for desalting, the sequential addition of the oxides is preferred, the propylene oxide being added to the partial ester and the ethylene oxide being added to provide the terminal groups of the oxyalkylene chain. Preferably, the desalting compounds contain at least as much oxide as ester nucleus by weight and contain ethylene oxide in at least equal amounts to propylene oxide by weight. The optimum compounds contain about twice as much oxide as esters by weight and about twice as much ethylene oxide as propylene oxide by weight.

For compounds suitable as demulsifiers for naturally occurring crude oil emulsions, the oxyalkylation preferably is carried out such that the mixed oxides are added in a heterogeneous manner by reacting mixtures of ethylene oxide and propylene oxide. These compositions may also be produced in which propylene oxide is the sole oxide added. The compounds contain at least two parts by weight of oxide to one part by weight of esters and at least 50% of the oxides should be propylene oxide, the maximum being 100% propylene oxide.

This aspect of the invention is further illustrated in the following examples of preferred embodiments thereof but is not limited thereto.

Intermediate Example I

In a Dowtherm jacketed reaction kettle equipped with a mechanical stirrer and a return condenser system permitting the removal of any aqueous phase formed in the course of reaction, there are added 5,300 parts by weight of a semi-refined tall oil, 1,300 parts by weight of pentaerythritol, 4 parts by weight of sodium hydroxide and 750 parts by weight of a suitable hydrocarbon extract. The reaction mass is heated slowly with agitation to 265–270° C., during which time 318 parts by weight of an aqueous distillate are removed. The resulting intermediate product is a tall oil ester of pentaerythritol in which an average of about 1.8 of the four hydroxyls have been esterified.

Intermediate Example II

In a manner similar to Example I, an intermediate product from dipentaerythritol and tall oil is made. To 2,240 parts by weight of tall oil there are added 750 parts of a suitable hydrocarbon vehicle and 4 parts by weight of powdered sodium hydroxide. This mixture is heated to 180° C., and then 950 parts by weight of dipentaerythritol are added rapidly. The temperature is then raised quickly to 245–250° C.—taking off approximately 138 parts by weight of an aqueous distillate. The reaction mass is cooled to 170° C., and 2,465 parts by weight of a hydrocarbon vehicle is added to yield the intermediate product in which two of the hydroxyls of the dipentaerythritol have been esterified and four remain unreacted.

Intermediate Example III

In a manner similar to Example I, 4,835 parts by weight of a refined tall oil, 15 parts by weight of calcium hydroxide and 825 parts by weight of a hydrocarbon carrier are charged into a reactor and heated to 195° C. At this point 1,500 parts by weight of a tripentaerythritol are added, and the temperature is raised rapidly to 245° C. to remove 290 parts of an aqueous distillate. The resulting material has 4 hydroxyls esterified with tall oil and 4 unreacted hydroxyls.

OXYALKYLATION OF PARTIAL ESTERS

Intermediate Example IV

Into an oxyalkylation reactor having a nominal capacity of 1,600 gallons, there are charged 5,000 parts by weight of an intermediate product prepared according to the intermediate Example III and 15 parts of sodium hydroxide. The reactor is equipped with an external jacket which may be used either for heating or cooling the contents. Agitation in this reactor is secured through cycling by means of a mechanical pump. Into a transfer bomb there are charged 2,500 parts by weight of propylene oxide. The contents of the reactor are heated to 135–140° C., and the propylene oxide is gradually introduced into the reactor, during which time an exothermic reaction causes the temperature to rise gradually to 150–160° C. The reactor contents are then recycled for two hours at this temperature.

Eighty-two hundred parts by weight of ethylene oxide are then charged into the transfer bomb and slowly added to the reactor. Again after the addition is completed the contents are recycled for 2 hours at 150–160° C. to yield the finished product.

*Intermediate Example V*

Into an oxyalkylation reactor having a nominal capacity of 1,000 gallons, but otherwise similar in design to the one described in Intermediate Example IV, there are charged 2,565 parts by weight of an intermediate product prepared according to the procedure outlined in Intermediate Example II and six parts by weight of sodium hydroxide. Into the transfer bomb there are charged 1,710 parts by weight of propylene oxide.

The reactor contents are heated to 145° C., and then addition of the propylene oxide is begun at such a rate that the exothermic reaction causes the reactor temperature to stay between 145–150° C. After the addition is complete, the contents are recycled for one hour at 150° C.

Into the transfer bomb there are then charged 3,600 parts by weight of ethylene oxide which is then slowly added to the reactor. The temperature at this stage may reach as high as 160° C. After a final recycling period of two hours, the finished product is cooled and drummed out.

*Intermediate Example VI*

Into an oxyalkylation reactor similar to the one described in Intermediate Example IV, but having a nominal capacity of 350 gallons, there are charged 500 parts by weight of an intermediate material prepared according to the procedure outlined under Intermediate Example I, and 2.5 parts by weight of sodium hydroxide. Into the transfer bomb there are charged 1,500 parts by weight of ethylene oxide and 500 parts by weight of propylene oxide. The oxides are thoroughly mixed by recirculation for a period of at least two hours.

The reactor contents are heated to 145°–150° C., and the mixture of oxides is slowly added at a rate at which the exothermic reaction will keep the temperature between 150–160° C. After all of the oxide has been introduced into the reactor, the product is recycled for two hours at 160° C. before cooling.

The hydrocarbon vehicle in the foregoing examples is sulfur dioxide extract. The material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains and is designated in the trade as sulfur dioxide extract or SO$_2$ extract. Examples of other suitable hydrocarbon vehicles are toluene, xylene, gas oil, diesel fuel, bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

OTHER POLYHDROXY ORGANIC COMPOUNDS

One class of compounds suitable as the other polyhydroxy compound in the dicarboxy acid esters of this invention are polyoxyalkylene glycols. Many forms of these compounds are commercially available or can be readily derived from available materials. Those notably suitable for the purposes of the instant invention are polyoxypropylene glycols having the general formula $$HO(C_3H_6O)_nH$$

having a molecular weight of at least 1,200 and preferably not exceeding 3,500 and which are terminally oxyethylated with 2–20 mols of ethylene oxide per mol of glycol. Alternatively, the polyoxypropylene glycols may be substituted by polyoxyethylene, polyoxypropylene glycols having a molecular weight of 1,200–3,500 in which the glycol molecule is composed of a heterogeneous mixture of oxyethylene and oxypropylene groups and in which the weight ratio of oxyethylene to oxypropylene groups does not exceed 4:1. These heterogeneous glycols may be used per se or may be terminally oxyethylated with 1–12 mols of ethylene oxide per mol of glycol. The oxyalkylated polyamines, ethylene glycol, glycerol, etc., are prepared similarly.

The oxyalkylated castor oil may be oxyethylated or both oxyethylated and oxypropylated—either sequentially, first with propylene oxide and then with ethylene oxide, or heterogeneously with a mixture of the two oxides. Oxyethylated castor oil per se is well known, and detailed description of this product is unnecessary except to say that for purposes of the invention the average molecular weight of the oxyethylated castor oil should be at least 1,400 and is preferably less than 3,500.

However, the castor oils which are both oxyethylated and oxypropylated or not as well known as the oxyethylated castor oil products. Accordingly, these products and their method of manufacture will be discussed in more detail.

As heretofore stated, in this type of product, the oxyalkylation is effected by reacting both ethylene and propylene oxide giving a product with the oxyethylene and oxypropylene groups occurring in a random or heteric manner. Satisfactory products can also be made in which oxide addition is carried out in a sequential manner so that the ethylene and propylene oxide residues would occur in an orderly manner throughout the molecular structure of the composition. In this so-called sequential type of product it is preferred that the propylene oxide molecules be adjacent to the castor oil molecules and the ethylene oxide molecules be terminally located; that is to say, the ethylene oxide residues would be removed from the castor oil molecule by the intervening propylene oxide residues. For matters of convenience and practicality our preferred procedure involves mixing the oxides prior to the oxyalkylation reaction. The preferred ratio of ethylene oxide to propylene oxide is from 1 to 1 to 10 to 1 by weight. The intermediate oxide adducts should have a minimum molecular weight of 1,500 and maximum molecular weight of 3,600.

The temperature employed is subject to variation, but ordinarily a temperature of about 160° C. is employed initially, and after the reaction starts the temperature may vary within the range of about 130 to 200° C. The pressures employed are also subject to variation but are usually within the range of 30 to 100 pounds per square inch gauge.

The preparation of these intermediate compounds are illustrated in the following examples wherein the parts are by weight unless otherwise stated.

*Intermediate Example VII*

In an autoclave having a two-liter capacity equipped with a means of external electric heating, internal cooling coils and mechanical agitation, there is charged 611 parts of castor oil and 1 part of sodium hydroxide. Into a transfer bomb there is mixed 305 parts ethylene oxide and 204 parts of propylene oxide. The castor oil is heated to a temperature of 142° C., and the mixed oxides are introduced into the autoclave until a pressure of 80 p.s.i. is secured. The reaction mixture is gradually heated until an exothermic reaction begins to take place. The external heating is then removed and the mixed oxides added at such a rate that the temperature is maintained between 160–170° C. with a pressure range of 80 to 120 p.s.i. After approximately four hours the entire charge of mixed oxides has been added to the autoclave, and the temperature is maintained for an additional 15 minutes to make certain that the free oxide is reduced to a minimum. The resulting product is a mixed oxide adduct of castor oil in which the ratio of ethylene oxide to propylene oxide is approximately 3 to 2 by weight, and the molecular weight of the product is approximately 1,650.

*Intermediate Example VIII*

Into an oxyalkylation reactor having a nominal capacity of 55 gallons, there is charged 90 parts of castor oil and 0.3 part of sodium hydroxide. The reactor is equipped with an external jacket which may be used either for heating or cooling the contents. Agitation in this reactor is secured through cycling by means of a mechanical pump. Into a transfer bomb there is charged 38 parts of propylene oxide and 133 parts of ethylene oxide. The castor oil in the reactor is heated to 158° C. and at that point the mixed oxides are gradually introduced into the reactor until a pressure of 40 p.s.i. has been built up. The reaction mass is gradually heated. At 161° C. an exothermic reaction commences and the external source of heat is removed. The addition of oxide is continued so that the temperature of approximately 170° C. and pressure of 40 p.s.i. is maintained. After 60 pounds of the mixed oxide had been charged and completely reacted, a sample is removed which is identified as Sample 1. Sample 2 is removed after an additional 25 pounds of the mixed oxide has been added and reacted. Sample 3 is removed after an additional 25 pounds of mixed oxide has been added and reacted. Sample 4 is removed after an additional 50 pounds of mixed oxide has been added and reacted. The resulting samples are mixed oxide adducts of castor oil in which the ratio of ethylene oxide to propylene oxide is approximately 3½ to 1 by weight. The approximate molecular weights of the several samples removed are as follows:

Sample 1—1,500
Sample 2—1,750
Sample 3—2,000
Sample 4—2,500

*Intermediate Example IX*

In a manner similar to Intermediate Example VIII, mixed oxide adducts of castor oil were prepared in which the ratio of ethylene oxide to propylene oxide was 5 to 1 by weight. Four samples were removed during the process of this reaction. The approximate molecular weights of the four samples were:

Sample 1—1,500
Sample 2—2,000
Sample 3—2,500
Sample 4—3,000

*Intermediate Example X*

In a manner similar to Intermediate Example VIII, the mixed oxide adducts of castor oil was prepared in which the ratio of ethylene oxide to propylene oxide was approximately 10 to 1 by weight. Three samples were secured during this process and the approximate molecular weights of these samples were:

Sample 1—2,000
Sample 2—2,600
Sample 3—3,600

The oxyalkylated phenol-formaldehyde resins may be either oxyethylated phenol-formaldehyde or oxyethylated, oxypropylated phenol-formaldehyde resins. The phenol-formaldehyde resins per se are organic-solvent-soluble and are preferably alkali insoluble. The phenol preferably is a mono-alkyl phenol having up to 15 carbons in the alkyl group. Dialkyl phenols are not suitable for purposes of this invention, but amounts up to 25% dialkyl phenol in monoalkyl phenol may be tolerated.

The phenol formaldehyde condensation products are prepared by reacting formaldehyde or a substance which breaks down to formaldehyde under the reaction conditions, e.g., paraformaldehyde and trioxane, and a monoalkyl phenol, preferably crude alkylated phenol for economic reasons, by heating the reactants in the presence of a small amount of acid catalysts such as sulfamic acid. The aqueous distillate which begins to form is collected and removed from the reaction mixture. After several hours of heating at temperatures slightly above the boiling point of water, the mass becomes viscous and is permitted to cool to about 100 to 105° C. At this point a suitable hydrocarbon fraction is added, and heating is resumed. Further aqueous distillate begins to form and heating is continued for an additional number of hours until at least about one mol of aqueous distillate per mol of reactants has been secured. The product is permitted to cool to yield the phenol formaldehyde condensation product in a hydrocarbon solvent. The molecular weight of these intermediate condensation products cannot be ascertained with certainty, but we would approximate that they contain about 3 to 15 phenolic nuclei per resin molecule. The solubility of the condensation product in hydrocarbon solvent would indicate that the resin is a linear type polymer, thus distinguishing them from the more common phenol formaldehyde resins of the cross-linked type.

The intermediate phenol formaldehyde condensation products used in preparing the compositions of this invention and methods of their preparation are illustrated in the following examples. All parts are by weight unless otherwise designated.

*Intermediate Example XI*

In a three-necked reaction flask provided with means of mechanical stirring and a return condenser system permitting the removal of any aqueous phase formed in the course of reaction, there is added 1,500 parts of a crude alkylate phenol which comprises an undistilled nonyl phenol containing approximately 10% of dinonylphenol, 225 parts paraformaldehyde and 3 parts sulfamic acid which is present as a catalyst in the reaction. The reaction mass is heated, and at 108° C. an aqueous distillate begins to form. After three hours heating at approximately 110° C., the mass becomes quite viscous and is permitted to cool to about 100° C. At this point 600 parts of a suitable hydrocarbon fraction is added and heating resumed. Again at 110° C. further aqueous distillate begins to form and heating is continued for an additional three hours, or until approximately 141 ccs. of aqueous distillate has been secured at a maximum temperature of 212° C. The product is permitted to cool to yield the finished phenol formaldehyde condensation product.

*Intermediate Example XII*

In a manner similar to Intermediate Example XI, 1,000 parts of a crude alkylate phenol, 120 parts of paraformaldehyde and 2 parts sulfamic acid were heated 2 hours at 105–110° C. to permit reaction of the phenol and formaldehyde under conditions minimizing formaldehyde loss. At temperatures above 110° C. vigorous reaction sets in which must be controlled by cooling. After about 27 parts of aqueous distillate have been secured, the reaction comes under control and becomes exceedingly viscous. At this point the resin is cooled to 105° C., and 400 parts of a suitable hydrocarbon fraction is added. Heating is continued for an additional three hours or until a total of about 75 parts of aqueous distillate have been removed at maximum temperature of 212° C. to yield the finished phenol formaldehyde condensation product.

*Intermediate Example XIII*

In a manner similar to Intermediate Examples XI and XII, 1,000 parts of a crude alkylate phenol, 90 parts paraformaldehyde and 2 parts sulfamic acid are carefully reacted at temperatures of 100–110° C. When the reaction mass becomes quite viscous, the reaction is permitted to cool, and 400 parts of a suitable hydrocarbon fraction is added and heating resumed for an additional hour or until a total of 55 parts of aqueous distillate have been secured at maximum temperature of 213° C.

Having prepared the intermediate phenol-formaldehyde resins, the next step is the oxyalkylation thereof. The oxyalkylation may be carried out with ethylene oxide, propylene oxide, mixtures of the two oxides, or by sequential addition of the two oxides—preferably with the propylene oxide being adducted first and the ethylene oxide being terminally added to the oxypropylated resin. Oxyalkylation is achieved by mixing the phenol-formaldehyde condensation product in a hydrocarbon solvent with a small amount of sodium hydroxide in an autoclave. The condensation product is heated above 100° C., and alkylene oxide is charged into the autoclave until the pressure is in the vicinity of 75 to 100 p.s.i. The reaction mixture is gradually heated until an exothermic reaction begins. The external heating is then removed, and alkylene oxide is added at such a rate that the temperature is maintained between about 150–160° C. in a pressure range of 80 to 100 p.s.i. After all of the alkylene oxide has been added, the temperature is maintained for an additional 10 to 20 minutes to assure substantially complete reaction of the alkylene oxide. The weight ratio of ethylene oxide to phenol-formaldehyde condensation product in an oxyethylated product may be as low as 1:2.5, respectively. In the case of the other alkylene oxides, particularly the mixtures thereof, the ratio, for most applications, will fall between about 2:3 and 9:1, preferably in the range of 2:3 to 2.5:1.

Examples of oxyalkylated phenol-formaldehyde condensation products contemplated by this invention are illustrated below, wherein the parts are by weight unless otherwise indicated.

Intermediate Example XIV

In an autoclave having a two-liter capacity equipped with a means of external electric heating, internal cooling coils and mechanical agitation, there is charged 400 parts of the condensation product of Intermediate Example XI and 2 parts of sodium hydroxide. Into a transfer bomb there is introduced 835 parts ethylene oxide. The condensation product is heated to 135° C., and the ethylene oxide is charged into the reactor until reactor pressure is 80 p.s.i. The reaction mixture is gradually heated until an exothermic reaction begins to take place. The external heating is then removed and ethylene oxide is then added at such a rate that the temperature is maintained between 150–160° C. with a pressure range of 80 to 100 p.s.i. After approximately six hours all of the oxide has been added to the autoclave, and the temperature is maintained for an additional 15 minutes to make certain that the unreacted oxide is reduced to a minimum. The resulting product is the ethylene oxide adduct of a phenol formaldehyde condensate, in which the ratio of oxide to condensate by weight is 2 to 1.

Intermediate Example XV

Following the procedure of Intermediate Example XIV, the following oxyethylated phenol-formaldehyde condensation products were prepared:

|   | Phenol-formaldehyde resin of Intermediate Example | Ratio of ethylene oxide to resin |
|---|---|---|
| (a) | XI | 2:3 |
| (b) | XII | 1.5:1 |
| (c) | XII | 2:1 |
| (d) | XIII | 1.5:1 |
| (e) | XIII | 2:1 |
| (f) | XI | [1] 4:1 |

[1] Propylene oxide substituted for ethylene oxide.

The preparations of phenol-formaldehyde condensation products which are oxyalkylated with both ethylene oxide and propylene oxide are illustrated in the following examples wherein the parts are again by weight unless otherwise stated.

Intermediate Example XVI

In the same facilities as used in Intermediate Example XIV, there is charged 172 parts of the resin solution of Intermediate Example XI and 1 part of sodium hydroxide. Into a transfer bomb there is introduced 250 parts by weight of ethylene oxide and 250 parts of propylene oxide. The intermediate is heated to 135° C., and the mixed oxides are charged into the reactor until the reactor pressure is 80 p.s.i. The reaction conditions from here on are identical with those employed in Intermediate Example XIV. The resulting product is the mixed oxide adduct of a phenolformaldehyde resin in which the ratio of oxide to resin by weight is approximately 4 to 1. The oxyalkylated phenol-formaldehyde condensation product had a hydroxyl equivalent weight of about 1,400 and contained about ten oxyalkylene chains per resin molecule.

Intermediate Example XVII

In a manner similar to Intermediate Example XVI, the following mixed oxide adducts of phenol-formaldehyde condensation products are prepared:

|   | Phenol-formaldehyde resin of Intermediate Example | Ratio of ethylene oxide to propylene oxide | Ratio of oxide to resin | Hydroxyl Equivalent |
|---|---|---|---|---|
| (a) | XIII | 1:1 | 6:1 | 1,400 |
| (b) | XIII | 1:3 | 6:1 | 1,500 |
| (c) | XII | 1:3 | 2:1 | |
| (d) | XI | 3:1 | 1:1 | 700 |

Intermediate Example XVIII

In a manner similar to Intermediate Example XIV, there is prepared a propylene oxide adduct of the resin of Intermediate Example XI in which the ratio of propylene oxide to resin by weight is 1 to 1. The oxypropylated phenol formaldehyde resin was then reacted further with ethylene oxide until the finished product contained 10% by weight of ethylene oxide. The oxyalkylated phenolformaldehyde condensation product had a hydroxyl equivalent weight of about 750 and contained about ten oxyalkylene chains per resin molecule.

Intermediate Example XIX

In a manner similar to Intermediate Example XVIII, a propylene oxide adduct of the resin of Intermediate Example XIII was prepared in which the ratio of propylene oxide to resin was 6 to 1 by weight. Ethylene oxide was then added to this oxypropylated phenol-formaldehyde resin until the finished product contained 20% by weight of ethylene oxide. The oxyalkylated phenol formaldehyde condensation product had a hydroxyl equivalent weight of about 1,200 and contained about four oxyalkylene chains per resin molecule.

Intermediate Example XX

In a manner similar to Intermediate Example XVIII, a propylene oxide adduct of the resin of Intermediate Example XI was prepared in which the ratio of propylene oxide to resin was 9 to 1 by weight. This oxypropylated phenol formaldehyde resin was then further reacted with ethylene oxide until the finished material contained 5% by weight of ethylene oxide. The oxyalkylated phenol-formaldehyde condensation product had a hydroxyl equivalent weight of about 1,400 and contained about ten oxyalkylene chains per resin molecule.

Intermediate Example XXI

In a manner similar to Intermediate Example XVIII, a propylene oxide adduct of the resin of Intermediate Example XIII was prepared in which the ratio of propylene oxide to resin was 2 to 1 by weight. This oxypropylated phenol-formaldehyde resin was then further reacted with ethylene oxide until the finished material contained 30% by weight of ethylene oxide. The oxyalkylated phenol-formaldehyde condensation product had a hydroxyl equivalent weight of about 1,200 and contained about four oxyalkylene chains per resin molecule.

The phenol-formaldehyde-polyamine condensation products are prepared by reacting formaldehyde or a substance which breaks down to formaldehyde under reaction conditions, e.g., paraformaldehyde and trioxane, a monoalkyl phenol, preferably crude alkylated phenol for economic reasons, and an alkylene polyamine by heating the reactants in the presence of a small amount of an alkaline catalyst such as sodium hydroxide. In some cases, the polyamine itself serves as the alkaline catalyst. The condensation reaction is carried out under substantially anhydrous conditions—excepting the water produced during the reaction. The aqueous distillate which begins to form when the reactants are heated is collected and removed from the reaction mixture. The phenol-formaldehyde-polyamine condensation product may be prepared by agitating and heating a mixture of the three reactants. In this case, the presence of the polyamine provides sufficient alkalinity for the condensation reaction. Alternatively, the phenol and formaldehyde may be only partially condensed—e.g., by heating the reactants for a shorter period of time than necessary to obtain complete condensation and leaving in the reaction mixture some unreacted phenol and formaldehyde. The reaction mixture is then cooled somewhat, and the alkylene polyamine is added to the reaction mixture. Heat is again applied to remove the water of reaction. Heating is continued until the amount of aqueous distillate collected indicates that the condensation is complete.

It is preferred that the alkylene polyamines be those having two primary amino groups, e.g., ethylene diamine, propylene diamine, hexamethylene diamine, diethylene triamine, triethylene tetraamine, tetraethylene pentamine, higher polyalkylene polyamine homologs thereof, and mixtures thereof. The terminal amino groups of the alkylene polyamines, however, may be secondary amino groups such as those in N-substituted alkyl alkylene polyamines. The oxyalkylating agents are lower alkylene oxides, e.g., ethylene oxide, propylene oxide, or mixtures of ethylene oxide and propylene oxide and the weight ratio of the alkylene oxide to the phenol-formaldehyde-polyamine condensation product will, for most applications, fall between about 2:3 and 10:1, or slightly higher, respectively. The phenol-formaldehyde-polyamine condensation products contain about 4 to 15 phenolic nuclei per resin molecule.

Where both ethylene oxide and propylene oxide are used to oxyalkylate the condensation product, they may be reacted as a mixture or the oxide may be added sequentially—e.g., the propylene oxide being added to the resin first and the ethylene oxide being added to the oxypropylene groups. In the latter case, the terminal oxyalkylated groups are those of oxyethylene, which have primary hydroxyl groups. Simultaneously reaction of a mixture of the oxides probably gives an oxyalkylated product having both types of terminal hydroxy groups.

Specific embodiments of intermediate products are illustrated in the following examples, wherein the parts are by weight unless otherwise stated.

Intermediate Example XXII

In a three-necked reaction flask provided with means of mechanical stirring and a return condenser system permitting the removal of any aqueous phase formed in the course of the reaction, there is added 750 parts of a crude alkylate phenol which comprises an undistilled nonylphenol containing approximately 10% of dinonyl phenol, 100 parts paraformaldehyde and 2 parts of finely-divided sodium hydroxide which is present as a catalyst in the reaction. These materials are heated to 60° C., and at this point the source of heat is removed. The temperature rises slowly to approximately 110° C., at which point it is held for two hours. At this point 250 parts of a suitable hydrocarbon extract is added, and heat is applied to remove 36 parts of aqueous distillate at a maximum temperature of 150° C. The reaction mass is cooled to 130° C., and at this point is added 100 parts of a crude mixtu reof polyethylene polyamines, approximately 10% of which is triethylene-tetramine, 40% tetraethylenepentamine and the remainder homologs higher than tetraethylenepentamine. Heat is again applied to remove 22 parts of aqueous distillate with a maximum final temperature of 220° C. At this point the material is cooled to 150° C., and 250 parts of a suitable hydrocarbon extract is added to give the finished phenol-formaldehyde-alkylene polyamine resin.

Intermediate Example XXIII

In a manner similar to Intermediate Example XXII, 3750 parts of crude alkylate phenol, 700 parts paraformaldehyde and 20 parts sodium hydroxide were reacted at temperatures between 100–110° C. for a period of 2 hours. At the end of this period of heating 2000 parts of a suitable hydrocarbon extract were added, and the temperature was raised to remove 200 parts of aqueous distillate with a maximum final temperature of 116° C. At this point, 1000 parts of a suitable hydrocarbon extract, and 350 parts diethylene triamine were added. The temperature is again raised to remove 255 parts aqueous distillate with a maximum final temperature of 210° C. This gives the finished resin.

The alkylene polyamine serves as a linking radical in the polymer chain, connected at two amino nitrogens by a methylene group, supplied by the formaldehyde, to the phenolic nuclei and possibly partly to other alkylene polyamine groups. With alkylene polyamines containing two terminal primary amino groups, such as those heretofore named, the reaction with formaldehyde in all probability is at the terminal primary amino groups.

Oxyalkylation of the phenol-formaldehyde-polyamine condensation products is carried out in the same manner as described above in regard to oxyalkylation of the phenol-formaldehyde condensation products and is illustrated by the following examples.

Intermediate Example XXIV

In an autoclave having a nominal capacity of 5 gallons, equipped with a means of external heating, cooling and mechanical agitation, there is charged 22 parts of the resin of Intermediate Example XXIII. Into a transfer bomb there is charged 25 parts ethylene oxide. The reactants are heated to 145° C., and the ethylene oxide is added until the reactor pressure is 30 p.s.i. The reaction mixture is gradually heated until an exothermic reaction begins to take place. The external heating is then removed, and ethylene oxide is added at such a rate that the temperature is maintained between 150–160° C. with a pressure range of 80 to 100 p.s.i. After approximately two hours, 22 parts of ethylene oxide has been added to the autoclave, and the temperature is maintained for an additional 30 minutes to make sure that the unreacted oxide is reduced to a minimum. The resulting product is the ethylene oxide adduct of a phenol-formaldehyde-alkylene polyamine resin in which the ratio of oxide to resin by weight is about 1 to 1.

Intermediate Example XXV

In a manner similar to Intermediate Example XXIV, a mixed oxide adduct of the resin of Intermediate Example XXIII was prepared in which the ratio of ethylene oxide to propylene oxide was 1 to 1. The finished product is a material in which the ratio of mixed oxides to resin is 6 to 1.

The hydrocarbon vehicle in the foregoing examples is SO₂ extract.

DICARBOXYLIC ACIDS

Dicarboxylic acids or, in some instances, their anhydrides, which may be used to prepare the compositions of our invention include diglycolic, phthalic, oxalic, maleic, malonic, succinic, adipic, azelaic, sebacic, fumaric, tartronic, malic, camphoric, tartaric and terephthalic acids. Higher molecular weight polybasic acids which may be used include Emery's dimer acid and VR–1 acid.

Emery dimer acid is essentially dilinoleic acid and is a polymer made by polymerizing an unsaturated fatty acid containing at least two nonconjugated double bonds. Such acids may also be described as polymer drying oil acids. The term "drying oil acid" is used herein to mean an unsaturated fatty acid containing at least two double bonds and at least six carbon atoms. The polymer acids employed for the purpose of the invention preferably consist predominantly of dimer acids but may contain trimers and higher polymers. The preferred polymer acids are those containing 12 to 40 carbon atoms and especially the polymers of the drying oil acids of the linoleic acid series, including, for example, the polymers of sorbic acid, geranic acid, palmitolic acid, linoleic acid and humoceric acid. It will be understood that these polymers may include cogeneric mixtures of polycarboxy acids.

A number of these polymer acids are available as by-product materials. Thus, one source of the polymeric acids suitable for the purposes of this invention is the still residue of the dry distillation of castor oil in the presence of sodium hydroxide. VR–1 acid is an acid of this type.

VR–1 acid is a mixture of polybasic acids, with an average molecular weight of about 1,000. It has an average of slightly more than two carboxylic acid groups per molecule. It is a by-product acid, and is a dark amber, rather viscous liquid. A typical sample of VR–1 acid gave the following analysis:

Acid number _____ 150
Iodine number _____ 36
Saponification number _____ 172
Unsaponifiable matter _____percent__ 3.7, 3.5
Moisture content _____do____ 0.86

Another suitable polymer dicarboxy acid is the by-product material designated D–75 fatty acid and produced by the Harchem Company. This acid is basically a dimer acid mixture containing some trimer acids, similar to VR–1 acid, a product of the Rohm & Haas Company, and is essentially an addition polymerization product resulting from the dehydration and subsequent polymerization of ricinoleic acid in the dry distillation of castor oil. The analyses of D–75 acid ordinarily show values in the following ranges:

Acid number _____ 156–170
Saponification No. _____ 186–192
Iodine value _____ 42–55
Unsaponifiables _____percent__ 2–5

From the foregoing list of suitable dicarboxylic acids, it will be seen that a wide variety of acids of widely varying molecular weights may be employed in the practice of the invention. The polymer dicarboxy acids and the lower molecular weight acids such as diglycolic acid, phthalic acid or phthalic anhydride, malonic acid, etc., may be both employed in the same product, if desired.

While the foregoing polymer acids in their commercially marketed form may not be 100% dicarboxy acids, they are nearly so and are treated, for purposes of this invention, as being dicarboxy acids. If further reference be desired regarding the polymer dicarboxy acids herein described and contemplated, attention is directed to such references as U.S. Patent 2,482,761 and Industrial and Engineering Chemistry, vol. 32 (No. 6), pp. 802–809.

ESTERIFICATION OF THE DICARBOXY ACIDS TO YIELD THE FINAL PRODUCT

The esters of the dicarboxy acids of this invention are esters in which the carboxy groups are essentially completely esterified and in which the dicarboxy acid is esterified with (a) an oxyalkylated partial monocarboxylic acid ester of pentaerythritol and/or polypentaerythritols, previously defined, or (b) a composite of (a) and a different oxyalkylated polyhydroxy compound having a molecular weight of at least 1000. The final product usually contains substantial amounts of unreacted hydroxyl groups—depending upon the mol equivalents of carboxyl groups with relation to the mol equivalents hydroxyl groups. The pentaerythritol compound should constitute at least 20% of the total polyhydroxy compounds (a weight ratio of at least 1:4 of pentaerythritol derivative to the other polyhydroxy compound).

The esterification is carried out in a hydrocarbon solvent such as SO₂ extract at temperatures sufficiently high to assure substantially complete esterification of the carboxy groups of the dicarboxy acids. For this purpose, temperatures in the range of 225–300° C. are recommended. The reaction is carried out in a hydrocarbon diluent such as SO₂ extract, toluene, xylene, gas oil, diesel fuel, bunker fuel, or coal tar solvents, which diluents are adaptable to azeotropic distillation with water. The water of reaction is distilled off from the reaction mixture and separated from any diluent distilled over with the water. The diluent may be returned to the reaction vessel or may be flowed to storage.

The molar ratios of dicarboxy acid to total mols of polyhydroxy compounds may be varied from about 1:1.5 to about 2:1, respectively. When the polyhydroxy compounds are dihydric, a ratio of about 1:1.5 to 1:2, preferably closer to the latter ratio, is employed. The 1:2 product consists essentially of mixed di-esters of the dihydric compounds. At the lower ratios, the product will consist essentially of polyester condensates of a low order of condensation. When one or more of the polyhydroxy compounds are trihydric or greater, ratios higher than 1:2 may be used. However, care must be exercised in keeping the ratios sufficiently low so as to avoid excessive cross-linking—resulting in oil-insoluble gelatinous polymers which are unsuitable as demulsifiers. At ratios greater than 1:2 and using at least one polyhydroxy compound which is trihydric or greater, the ester linkages may be both intramolecular and intermolecular as respects the polyhydric component. Like the esters of dihydric compounds, these esters are more likely to be di-esters of dicarboxylic acids at molar ratios of dicarboxy acids to polyhydric compounds of about 1:2 and polycondensate esters at ratios substantially below 1:2, such as 1:1.5. At ratios above 1:2, caution must be exercised to be certain that the total mol equivalents of hydroxyl is at least equal to, and preferably in excess of, the total mols of carboxyl groups in the reaction mixture. Otherwise, a product containing substantial quantities of free carboxyl groups will be produced. For most purposes, molar ratios in excess of 1:1 and less than 1:1.5 are to be avoided in order to minimize excessive cross-linking—which in turn leads to resinous or gelatinous, oil-insoluble polymers unsuitable as demulsifiers.

This aspect of the invention will be further understood from the following examples, wherein the parts are by weight unless otherwise stated.

Example 1

Into a Dowtherm jacketed reaction kettle equipped with a mechanical stirrer and a return condenser system permitting the removal of any aqueous material formed during the reaction, there are added 2700 parts by weight of the oxyalkylated partial ester of pentaerythritol prepared according to the procedure outlined under Intermediate Example VI, 2700 parts by weight of a glycol which has been made by adding about six moles of ethylene oxide to a polyoxypropylene glycol of approximately 2700 molecular weight, 900 parts by weight of D-75 fatty acid, described supra, and 1250 parts by weight of $SO_2$ extract. The reactants are then heated to 270–275° C. and held at that point for two hours. During the entire heating time, approximately 40 parts by weight of an aqueous distillate is removed. The product is then cooled to 150° C., and 6600 parts by weight of $SO_2$ extract are added to yield the finished product.

*Example 2*

In a manner similar to that described under Example 1, there are reacted together 3300 parts by weight of an oxyethylated castor oil (30 moles of ethylene oxide per mole of castor oil) and 1650 parts by weight of the oxypropylated partial fatty acid ester of pentaerythritol identified in the first two paragraphs of Intermediate Example V, 450 parts by weight of diglycolic acid, and 750 parts by weight of $SO_2$ extract. The materials are heated slowly to 255° C. and are held at that temperature for one-half hour before cooling is applied. During the processing period, approximately 110 parts by weight of an aqueous distillate are removed. To yield the finished product, 2950 parts by weight of an aromatic hydrocarbon solvent are added. This product may be used per se or blended with other surface active materials to yield materials as per Example 4 below.

*Example 3*

In a manner similar to that described under Example 1, there are reacted together 330 parts by weight of the oxyethylated fatty acid ester of tripentaerythritol described in Intermediate Example IV, 45 parts by weight of diglycolic acid and 50 parts by weight of $SO_2$ extract. The materials are heated to a temperature of 260–265° C., during which time approximately 12 parts by weight of an aqueous distillate are removed. After cooling, 100 parts by weight of the above intermediate are blended with 160 parts by weight of a hydrocarbon solvent to yield the finished product.

*Example 4*

There is blended 1 part of a material as prepared in accordance with directions of Example 2 and 2 parts of diglycolic ester of a polyalkylene polyglycol having a molecular weight of approximately 3100.

*Example 5*

Following the preparatory technique of Example 1, the complex esters of the following reactants are prepared.

| Dicarboxy Acid | Parts | Polyhydric Compound No. 1 | | Polyhydric Compound No. 2 | |
|---|---|---|---|---|---|
| | | Intermediate Example No.— | Parts | Intermediate Example No.— | Parts |
| (a) Diglycolic acid | 150 | IV | 3,500 | XV (e) | 1,500 |
| (b) Diglycolic acid | 200 | VI | 3,000 | XXV | 1,800 |
| (c) Phthalic Anhydride | 175 | V | 4,200 | VIII | 1,200 |
| (d) Maleic acid | 140 | V | 2,200 | XVI | 3,400 |
| (e) Dilinoleic dimer acid | 850 | IV | 3,500 | XX | 1,900 |
| (f) Dilinoleic dimer acid | 1,000 | VI | 5,600 | None | |
| (g) Emery dimer acid | 900 | V | 2,200 | XV (a) | 3,000 |
| (h) VR-1 acid | 1,200 | VI | 2,000 | XIV | 3,400 |
| (i) {Diglycolic acid / Dilinoleic dimer acid} | 100 / 300 | IV | 2,500 | XVII (c) | 2,800 |
| (j) Suberic acid | 400 | VI | 2,500 | X | 2,500 |
| (k) Diglycolic acid | 150 | VI | 1,500 | XIX | 3,900 |

The foregoing examples are exemplary, though by no means exhaustive, of the wide variety of dicarboxy acid esters contemplated by this invention.

DEMULSIFICATION

The compositions of the present invention are particularly suitable for demulsification of brine-in-oil emulsions arising from desalting operation. They also find use in the demulsification of naturally-occurring emulsions of water or brine in crude oil. Demulsification is achieved by mixing the demulsifying agents of this invention, at a ratio in the approximate range of one part of the active demulsifying agent to 2,000–75,000 parts of the emulsion, and thereafter allowing the emulsion to remain in a relatively quiescent state during which separation of the oil and water occurs. The emulsion may be heated to further facilitate separation of the two phases as previously stated, and the emulsion breaking chemicals may be employed in combination with high voltage treatment of the emulsions in desalting operations. This method of breaking the emulsions resulting from desalting operations is often referred to electrical-chemical desalting operations.

In desalting operations, the water-in-oil emulsion may result from the mixing of a small amount of water with the oil for the purpose of extraction of salt from the crude oil. The majority of crude oils received by refineries for processing contain salt, present either as contaminants suspended in the oil or dissolved in a small amount of water usually present in the oil. In refinery operations, the salt-containing crude oil charged to the stills leaves salt deposits which drastically reduce thermal efficiency and eventually will plug up the processing equipment. Also, cracking equipment is particularly susceptible to corrosion, and the residual salts from untreated crude may hydrolyze during the cracking process to form hydrochloric acid or other acid compounds which readily attack iron.

The maximum salt content which can be tolerated by refineries varies somewhat with the design of the plant. In general, a salt content of 20 lbs. per 1,000 barrels of oil is the maximum amount acceptable for the crude charge stock. In many plants this maximum figure is as small as 5–10 lbs. per 1,000 barrels, partially because it has been found that some salts poison the catalyst used in catalytic cracking and platforming units.

Desalting is actually an extraction process which involves emulsifying the oil with fresh water by mechanical means, and then breaking the resulting emulsion by one of the methods discussed below. In most cases, only one extraction is necessary to extract the salt by preferential solution thereof in the aqueous phase. In a few cases, e.g., where the salt content is as high as 1,000 lbs. per thousand barrels of oil, two treatments may be necessary to get the salt content down to an acceptable value.

Three methods of destroying the emulsions resulting from desalting operations into their component phases of oil and water are presently in wide use—chemical treatment, electrical treatment, and combined chemical-electrical treatment. The application of heat has been more or less universally acknowledged as desirable, regardless of the method of treating. Heating lowers the viscosity of the oil and thus accelerates the separation of the oil and water. Temperatures ranging from about 160–250° F. are used in the majority of desalting installations, with as high as 350° F. used in isolated cases.

In the desalting process, the emulsification conditions are chosen so as to give intimate mixing of the water and oil. Because the oil and water are to be later separated, the degree of mixing, controlled through mixing valve pressure differentials, etc., will be to some extent controlled by the ease of breaking the emulsion. No emulsifying agents are added in the desalting process, although compounds having emulsifying activity may be inherently present in the crude oil.

In the case of chemical treating of emulsions resulting from desalting operations, the emulsion breaking chemical is added to the emulsion to speed up the separation of the oil and water into the two phases in the refinery settling drums. In the electrical process, the emulsion is subjected first to a high voltage in a unit where most of the salt water breaks out and is removed. The remaining emulsion is then pumped into the settling vessel where the remaining water drops out. In the combined electrical-chemical treatment, the emulsion breaking chemical is added to the emulsion before it reaches the electrical unit. The chemical serves the purpose of speeding up the separation of water and oil and in so doing gives a drier crude oil and cleaner effluent water. The total time involved in the entire desalting process is ordinarily about 20–60 minutes, and regardless of the method, caustic is usually added to the wash water in an amount sufficient to raise the pH of the effluent brine to at least 7.

The effectiveness of the compositions of this invention as demulsifying agents is illustrated in the following tests and data.

*Laboratory Desalting Bottle Test No. 1*

A sample crude oil having an API gravity of 42.2 and obtained from an Oklahoma refinery was emulsified in an electric blender for two minutes with 4% water of a pH of 9. A series of calibrated testing bottles were filled to the 100 ml. mark with the emulsion.

Ten percent solutions of eight demulsifying chemicals to be checked were then pipetted into the bottles at a treating ratio of 1 part chemical to 50,000 parts emulsion (the amount used was calculated to correspond to the ratio of desalting chemical to crude oil actually used in the refinery). The bottles were capped and mildly agitated with 50 manual shakes. They were then placed into a hot water bath, and heated to 200° F. and re-agitated for 100 manual shakes. After a quiescent period of 15 minutes a composite grindout on each bottle was made. The product of Example 1 proved to be an effective demulsifier in this application, and was superior to the seven other demulsifiers tested in the amount of residual emulsion after treatment.

*Laboratory Desalting Bottle Test No. 2*

A sample of Kansas crude from a refinery in Kansas was tested according to the procedure given in Bottle Test No. 1. The product of Example 1 had the lowest amount of residual emulsion at the end of the test in comparison with other demulsifiers tested, including the chemical actually used by the refinery in its desalting operations.

*Refinery Desalting Plant Test*

A chemical prepared according to the procedure given under Example 1 was tested in an Oklahoma refinery using electrical-chemical desalting treatment. The chemical previously in use required approximately 1 gallon per thousand barrels of oil. Using the composition of Example 1, the treating ratio was reduced to approximately 0.3 gallon per 1000 barrels. In conjunction with the reduced chemical consumption the salt removal efficiency was increased.

In bottle tests with crude oil emulsions, the product of Example 4 proved to be superior over the actual demulsifying chemical used in demulsifying two different crudes with respect to amount of water separated and speed of water drop. The bottle tests were carried out so as to simulate field operations, and the chemicals were tested at the same dosages—1 part in about 16,700 in one case and 1 part in about 50,000 in the other case.

The invention is hereby claimed as follows:

1. In processes for breaking water-in-petroleum oil emulsions, adding to said emulsions, at a weight ratio of one part per 2000–75,000 parts of said emulsion, dicarboxy acid esters, wherein essentially all of the carboxy groups of the dicarboxy acids are esterified with two polyhydroxy lower alkylene oxide adducts of organic compounds, said adducts each having a molecular weight of at least 1000, and at least 20% by weight of said adducts being oxyalkylated, monocarboxylic acid, partial esters of pentaerythritols, said monocarboxylic acid selected from the group consisting of monocarboxylic resin acids, monocarboxylic fatty acids of 12–36 carbons, and mixtures thereof, at least one of the hydroxyl groups of said pentaerythritols being esterified with said monocarboxylic acids and at least two of said hydroxyl groups being polyoxyalkylated with alkylene oxides selected from the group consisting of propylene oxide and mixtures of ethylene oxide and propylene oxide wherein the propylene oxide constitutes at least 50% by weight of the oxide mixture, said oxyalkylated, partial esters having a molecular weight in excess of 1000, the remainder of said adducts being members selected from the group consisting of terminally oxyethylated polyoxypropylene glycols wherein the polyoxypropylene glycol nuclei have a molecular weight of at least 1200 and not exceeding 3500 and have 2–20 mols of adducted ethylene oxide per mol of polyoxypropylene glycol; polyoxyethylene, polyoxypropylene glycols having a molecular weight of 1200–3500 in which said glycol molecule is composed of a heterogeneous mixture of oxyethylene and oxypropylene groups in which the weight ratio of oxyethylene to oxypropylene does not exceed 4:1; oxyethylated castor oil having a molecular weight in the range of 1400 to 3500; oxyalkylated castor oil which is oxyalkylated with both ethylene oxide and propylene oxide in a weight ratio of 1:1 to 10:1, respectively, said oxyalkylated castor oil having a molecular weight in the range of 1500 to 3600; oxyethylated monoalkyl phenol-formaldehyde condensation products in which the alkyl group of the phenol has up to 15 carbon atoms, said alkyl phenol-formaldehyde condensation product having 3–15 phenolic nuclei per molecule, the weight ratio of ethylene oxide to alkyl phenol-formaldehyde condensation product being in the range of 1:2.5 to 2.5:1, respectively; oxyethylated, oxypropylated monoalkyl phenol-formaldehyde condensation products in which the alkyl group of the phenol has up to 15 carbon atoms, said alkyl phenol-formaldehyde condensation product having 3–15 phenolic nuclei per molecule, the weight ratio of the oxyethylene and oxypropylene groups to the monoalkyl phenol-formaldehyde condensation product being in the range of 2:3 to 2.5:1; oxyalkylated condensation products of a monoalkyl phenol, formaldehyde, and a lower alkylene polyamine containing about 4–15 phenolic nuclei per resin molecule, the oxyalkylene groups being a member selected from the group consisting of oxyethylene, oxypropylene, and both oxyethylene and oxypropylene, the weight ratio of the oxyalkylene groups to the monoalkyl phenol-formaldehyde-alkylene polyamine condensation product being in the range of 2:3 to 10:1, respectively; polyoxypropylene adducts of lower alkylene polyamines, which adducts are terminally oxyethylated and have a molecular weight of at least 1,000; polyoxypropylene adducts of lower polyhydric alcohols having 2–3 hydroxyl groups, which adducts are terminally oxyethylated and have a molecular weight of at least 1,000; adducts of both ethylene oxide and propylene oxide on lower alkylene polyamines, said adducts having a molecular weight of at least 1,000; and adducts of both ethylene oxide and propylene oxide on lower polyhydric alcohols having 2–3 hydroxyl groups, said adducts having a molecular weight of at least 1,000, and thereafter separating the water of the broken emulsion from the oil.

2. In processes for breaking water-in-petroleum oil emulsions, adding to said emulsions, at a weight ratio of one part per 2000–75,000 parts of said emulsion, dicarboxy acid esters, wherein essentially all of the carboxy groups of the dicarboxy acids are esterified with two polyhydroxy lower alkylene oxide adducts of organic compounds, said adducts each having a molecular weight of at least 1000, and at least 20% by weight of said adducts being oxyalkylated, monocarboxylic acid, partial esters of pentaerythritols, said monocarboxylic acid selected from the group consisting of monocarboxylic resin acids, monocarboxylic fatty acids of 12–36 carbons, and mixtures thereof, at least one of the hydroxyl groups of said pentaerythritols being esterified with said monocarboxylic acids and at least two of said hydroxyl groups being sequentially polyoxyalkylated with first propylene oxide and then ethylene oxide at a mol ratio not exceeding nine mols of ethylene oxide per mol of propylene oxide so that the polyoxyethylene groups are terminally positioned on the polyoxyalkylene radicals, the weight of ethylene oxide added being at least equal to the weight of the propylene oxide added, the molecular weight of the oxyalkylated, partial esters being greater than 1000, the remainder of said adducts being members selected from the group consisting of terminally oxyethylated polyoxypropylene glycols wherein the polyoxypropylene glycol nuclei have a molecular weight of at least 1200 and not exceeding 3500 and have 2–20 mols of adducted ethylene oxide per mol of polyoxypropylene glycol; polyoxyethylene, polyoxypropylene glycols having a molecular weight of 1200–3500 in which said glycol molecule is composed of a heterogeneous mixture of oxyethylene and oxypropylene groups in which the weight ratio of oxyethylene to oxypropylene does not exceed 4:1; oxyethylated castor oil having a molecular weight in the range of 1400 to 3500; oxyalkylated castor oil which is oxyalkylated with both ethylene oxide and propylene oxide in a weight ratio of 1:1 to 10:1, respectively, said oxyalkylated castor oil having a molecular weight in the range of 1500 to 3600; oxyethylated monoalkyl phenol-formaldehyde condensation products in which the alkyl group of the phenol has up to 15 carbon atoms, said alkyl phenol-formaldehyde condensation product having 3–15 phenolic nuclei per molecule, the weight ratio of ethylene oxide to alkyl phenol-formaldehyde condensation product being in the range of 1:2.5 to 2.5:1, respectively; oxyethylated, oxypropylated monoalkyl phenol-formaldehyde condensation products in which the alkyl group of the phenol has up to 15 carbon atoms, said alkyl phenol-formaldehyde condensation product having 3–15 phenolic nuclei per molecule, the weight ratio of the oxyethylene and oxypropylene groups to the monoalkyl phenol-formaldehyde condensation product being in the range of 2:3 to 2.5:1; oxyalkylated condensation products of a monoalkyl phenol, formaldehyde, and a lower alkylene polyamine containing about 4–15 phenolic nuclei per resin molecule, the oxyalkylene groups being a member selected from the group consisting of oxyethylene, oxypropylene, and both oxyethylene and oxypropylene, the weight ratio of the oxyalkylene groups to the monoalkyl phenol-formaldehyde-alkylene polyamine condensation product being in the range of 2:3 to 10:1, respectively; polyoxypropylene adducts of lower alkylene polyamines, which adducts are terminally oxyethylated and have a molecular weight of at least 1,000; polyoxypropylene adducts of lower polyhydric alcohols having 2–3 hydroxyl groups, which adducts are terminally oxyethylated and have a molecular weight of at least 1,000; adducts of both ethylene oxide and propylene oxide on lower alkylene polyamines, said adducts having a molecular weight of at least 1,000; and adducts of both ethylene oxide and propylene oxide on lower polyhydric alcohols having 2–3 hydroxyl groups, said adducts having a molecular weight of at least 1,000, and thereafter separating the water of the broken emulsion from the oil.

3. In processes for breaking water-in-petroleum oil emulsions, adding to said emulsions, at a weight ratio of one part per 2000–75,000 parts of said emulsion, dicarboxy acid esters, wherein essentially all of the carboxy groups of the dicarboxy acids are esterified with two polyhydroxy lower alkylene oxide adducts of organic compounds, said adducts each having a molecular weight of at least 1000, and at least 20% by weight of said adducts being oxyalkylated, partial esters of tall oil and pentaerythritols, at least one of the hydroxyl groups of the pentaerythritols being esterified with the tall oil acids and at least two of said hydroxyl groups being polyoxyalkylated with alkylene oxides selected from the group consisting of propylene oxide and both ethylene oxide and propylene oxide in mol ratios not greater than 9:1, respectively, said oxyalkylated, partial esters having a molecular weight in excess of 1000, the remainder of said adducts being members selected from the group consisting of terminally oxyethylated polyoxypropylene glycols wherein the polyoxypropylene glycol nuclei have a molecular weight of at least 1200 and not exceeding 3500 and have 2–20 mols of adducted ethylene oxide per mol of polyoxypropylene glycol; polyoxyethylene, polyoxypropylene glycols having a molecular weight of 1200–3500 in which said glycol molecule is composed of a heterogeneous mixture of oxyethylene and oxypropylene groups in which the weight ratio of oxyethylene to oxypropylene does not exceed 4:1; oxyethylated castor oil having a molecular weight in the range of 1400 to 3500; oxyalkylated castor oil which is oxyalkylated with both ethylene oxide and propylene oxide in a weight ratio of 1:1 to 10:1, respectively, said oxyalkylated castor oil having a molecular weight in the range of 1500 to 3600; oxyethylated monoalkyl phenol-formaldehyde condensation products in which the alkyl group of the phenol has up to 15 carbon atoms, said alkyl phenol-formaldehyde condensation product having 3–15 phenolic nuclei per molecule, the weight ratio of ethylene oxide to alkyl phenol-formaldehyde condensation product being in the range of 1:2.5 to 2.5:1, respectively; oxyethylated, oxypropylated monoalkyl phenol-formaldehyde condensation products in which the alkyl group of the phenol has up to 15 carbon atoms, said alkyl phenol-formaldehyde condensation product having 3–15 phenolic nuclei per molecule, the weight ratio of the oxyethylene and oxypropylene groups to the monoalkyl phenol-formaldehyde condensation product being in the range of 2:3 to 2.5:1; oxyalkylated condensation products of a monoalkyl phenol, formaldehyde, and a lower alkylene polyamine containing about 4–15 phenolic nuclei per resin molecule, the oxyalkylene groups being a member selected from the group consisting of oxyethylene, oxypropylene, and both oxyethylene and oxypropylene, the weight ratio of the oxyalkylene groups to the monoalkyl phenol-formaldehyde-alkylene polyamine condensation product being in the range of 2:3 to 10:1, respectively; polyoxypropylene adducts of lower alkylene polyamines, which adducts are terminally oxyethylated and have a molecular weight of at least 1,000; polyoxypropylene adducts of lower polyhydric alcohols having 2–3 hydroxyl groups, which adducts are terminally oxyethylated and have a molecular weight of at least 1,000; adducts of both ethylene oxide and propylene oxide on lower alkylene polyamines, said adducts having a molecular weight of at least 1,000; and adducts of both ethylene oxide and propylene oxide on lower polyhydric alcohols having 2–3 hydroxyl groups, said adducts having a molecular weight of at least 1,000, and thereafter separating the water of the broken emulsion from the oil.

4. In processes for breaking water-in-petroleum oil emulsions, adding to said emulsions, at a weight ratio of one part per 2000–75,000 parts of said emulsion, dicarboxy acid esters, wherein essentially all of the carboxy groups of the dicarboxy acids are esterified with two polyhydroxy lower alkylene oxide adducts of organic compounds, said adducts each having a molecular weight of at least 1000, and at least 20% by weight of said adducts being oxyalkylated, partial esters of fatty acids having 12–36 carbons and pentaerythritols, at least one of the hydroxyl groups of the pentaerythritols being esterified with said fatty acids and at least two of said hydroxyl groups being polyoxyalkylated with alkylene oxides selected from the group consisting of propylene oxide and both ethylene oxide and propylene oxide in mol ratios not greater than 9:1, respectively, said oxyalkylated, partial esters having a molecular weight in excess of 1000, the remainder of said adducts being members selected from the group consisting of terminally oxyethylated polyoxypropylene glycols wherein the polyoxypropylene glycol nuclei have a molecular weight of at least 1200 and not exceeding 3500 and have 2–20 mols of adducted ethylene oxide per mol of polyoxypropylene glycol; polyoxyethylene, polyoxypropylene glycols having a molecular weight of 1200–3500 in which said glycol molecule is composed of a heterogeneous mixture of oxyethylene and oxypropylene groups in which the weight ratio of oxyethylene to oxypropylene does not exceed 4:1; oxyethylated castor oil having a molecular weight in the range of 1400 to 3500; oxyalkylated castor oil which is oxyalkylated with both ethylene oxide and propylene oxide in a weight ratio of 1:1 to 10:1, respectively, said oxyalkylated castor oil having a molecular weight in the range of 1500 to 3600; oxyethylated monoalkyl phenol-formaldehyde condensation products in which the alkyl group of the phenol has up to 15 carbon atoms, said alkyl phenol-formaldehyde condensation product having 3–15 phenolic nuclei per molecule, the weight ratio of ethylene oxide to alkyl phenol-formaldehyde condensation product being in the range of 1:2.5 to 2.5:1, respectively; oxyethylated, oxypropylated monoalkyl phenol-formaldehyde condensation products in which the alkyl group of the phenol has up to 15 carbon atoms, said alkyl phenol-formaldehyde condensation product having 3–15 phenolic nuclei per molecule, the weight ratio of the oxyethylene and oxypropylene groups to the monoalkyl phenol-formaldehyde condensation product being in the range of 2:3 to 2.5:1; oxyalkylated condensation products of a monoalkyl phenol, formaldehyde, and a lower alkylene polyamine containing about 4–15 phenolic nuclei per resin molecule, the oxyalkylene groups being a member selected from the group consisting of oxyethylene, oxypropylene, and both oxyethylene and oxypropylene, the weight ratio of the oxyalkylene groups to the monoalkyl phenol-formaldehyde-alkylene polyamine condensation product being in the range of 2:3 to 10:1, respectively; polyoxypropylene adducts of lower alkylene polyamines, which adducts are terminally oxyethylated and have a molecular weight of at least 1,000; polyoxypropylene adducts of lower polyhydric alcohols having 2–3 hydroxyl groups, which adducts are terminally oxyethylated and have a molecular weight of at least 1,000; adducts of both ethylene oxide and propylene oxide on lower alkylene polyamines, said adducts having a molecular weight of at least 1,000; and adducts of both ethylene oxide and propylene oxide on lower polyhydric alcohols having 2–3 hydroxyl groups, said adducts having a molecular weight of at least 1,000, and thereafter separating the water of the broken emulsion from the oil.

5. In processes for breaking water-in-petroleum oil emulsions, adding to said emulsions, at a weight ratio of one part per 2000–75,000 parts of said emulsion, dicarboxy acid esters, wherein essentially all of the carboxy groups of the dicarboxy acids are esterified with two polyhydroxy lower alkylene oxide adducts of organic compounds, said adducts each having a molecular weight of at least 1000, and at least 20% by weight of said adducts being oxyalkylated, partial esters of tall oil and pentaerythritols, at least one of the hydroxyl groups of said pentaerythritols being esterified with the tall oil acids and at least two of said hydroxyl groups being sequentially polyoxyalkylated with first propylene oxide and then ethylene oxide at a mol ratio not exceeding nine mols of ethylene oxide per mol of propylene oxide so that the polyoxyethylene groups are terminally positioned on the polyoxyalkylene radicals, the weight of ethylene oxide added being at least equal to the weight of the propylene oxide added, the molecular weight of the oxyalkylated, partial esters being greater than 1000, the remainder of said adducts being members selected from the group consisting of terminally oxyethylated polyoxypropylene glycols wherein the polyoxypropylene glycol nuclei have a molecular weight of at least 1200 and not exceeding 3500 and have 2–20 mols of adducted ethylene oxide per mol of polyoxypropylene glycol; polyoxyethylene, polyoxypropylene glycols having a molecular weight of 1200–3500 in which said glycol molecule is composed of a heterogeneous mixture of oxyethylene and oxypropylene groups in which the weight ratio of oxyethylene to oxypropylene does not exceed 4:1; oxyethylated castor oil having a molecular weight in the range of 1400 to 3500; oxyalkylated castor oil which is oxyalkylated with both ethylene oxide and propylene oxide in a weight ratio of 1:1 to 10:1, respectively, said oxyalkylated castor oil having a molecular weight in the range of 1500 to 3600; oxyethylated monoalkyl phenol-formaldehyde condensation products in which the alkyl group of the phenol has up to 15 carbon atoms, said alkyl phenol-formaldehyde condensation product having 3–15 phenolic nuclei per molecule, the weight ratio of ethylene oxide to alkyl phenol-formaldehyde condensation product being in the range of 1:2.5 to 2.5:1, respectively; oxyethylated, oxypropylated monoalkyl phenol-formaldehyde condensation products in which the alkyl group of the phenol has up to 15 carbon atoms, said alkyl phenol-formaldehyde condensation product having 3–15 phenolic nuclei per molecule, the weight ratio of the oxyethylene and oxypropylene groups to the monoalkyl phenol-formaldehyde condensation product being in the range of 2:3 to 2.5:1; oxyalkylated condensation products of a monoalkyl phenol, formaldehyde, and a lower alkylene polyamine containing about 4–15 phenolic nuclei per resin molecule, the oxyalkylene groups being a member selected from the group consisting of oxyethylene, oxypropylene, and both oxyethylene and oxypropylene, the weight ratio of the oxyalkylene groups to the monoalkyl phenol-formaldehyde-alkylene polyamine condensation product being in the range of 2:3 to 10:1, respectively; polyoxypropylene adducts of lower alkylene polyamines, which adducts are terminally oxyethylated and have a molecular weight of at least 1,000; polyoxypropylene adducts of lower polyhydric alcohols having 2–3 hydroxyl groups, which adducts are terminally oxyethylated and have a molecular weight of at least 1,000; adducts of both ethylene oxide and propylene oxide on lower alkylene polyamines, said adducts having a molecular weight of at least 1,000; and adducts of both ethylene oxide and propylene oxide on lower polyhydric alcohols having 2–3 hydroxyl groups, said adducts having a molecular weight of at least 1,000, and thereafter separating the water of the broken emulsion from the oil.

6. In a process for breaking petroleum oil emulsions of the water-in-oil type, adding to said emulsions a sufficient quantity to break the emulsions into its water and petroleum components of dicarboxy acid esters, wherein essentially all of the carboxy groups of the dicarboxy acids are esterified with two oxyalkylated adducts of organic compounds each having molecular weights of at least 1000, at least a substantial portion of said oxyalkylated organic compounds being oxyalkylated, monocarboxylic acid, partial esters of pentaerythritols, said monocarboxylic acid selected from the group consisting of monocarboxylic resin acids, monocarboxylic fatty acids of 12–36 carbons, and mixtures thereof, at least one of the hydroxyl groups of said pentaerythritols being esterified with said monocarboxylic acids and at least two of said hydroxyl groups being polyoxyalkylated with alkylene oxides selected from the group consisting of propylene oxide and both ethylene oxide and propylene oxide in mol ratios not greater than 9:1, respectively, said oxyalkylated, partial esters having a molecular weight in excess of 1000, the remainder of said adducts being members selected from the group consisting of terminally oxyethylated polyoxypropylene glycols wherein the polyoxypropylene glycol nuclei have a molecular weight of at least 1200 and not exceeding 3500 and have 2–20 mols of adducted ethylene oxide per mol of polyoxypropylene glycol; polyoxyethylene, polyoxypropylene glycols having a molecular weight of 1200–3500 in which said glycol molecule is composed of a heterogeneous mixture of oxyethylene and oxypropylene groups in which the weight ratio of oxyethylene to oxypropylene does not exceed 4:1; oxyethylated castor oil having a molecular weight in the range of 1400 to 3500; oxyalkylated castor oil which is oxyalkylated with both ethylene oxide and propylene oxide in a weight ratio of 1:1 to 10:1, respectively, said oxyalkylated castor oil having a molecular weight in the range of 1500 to 3600; oxyethylated monoalkyl phenol-formaldehyde condensation products in which the alkyl group of the phenol has up to 15 carbon atoms, said alkyl phenol-formaldehyde condensation product having 3–15 phenolic nuclei per molecule, the weight ratio of ethylene oxide to alkyl phenol-formaldehyde condensation products being in the range of 1:2.5 to 2.5:1, respectively; oxyethylated, oxypropylated monoalkyl phenol-formaldehyde condensation products in which the alkyl group of the phenol has up to 15 carbon atoms, said alkyl phenol-formaldehyde condensation product having 3–15 phenolic nuclei per molecule, the weight ratio of the oxyethylene and oxypropylene groups to the monoalkyl phenol-formaldehyde condensation product being in the range of 2:3 to 2.5:1; oxyalkylated condensation products of the monoalkyl phenol-formaldehyde, and a lower alkylene polyamine containing about 4–15 phenolic nuclei per resin molecule, the oxyalkylene groups being a member selected from the group consisting of oxyethylene, oxypropylene, and both oxyethylene and oxypropylene, the weight ratio of the oxyalkylene groups to the monoalkylene phenol-formaldehyde condensation product being in the range of 2:3 to 10:1, respectively; polyoxypropylene adducts of lower alkylene polyamines, which adducts are terminally oxyethylated and have a molecular weight of at least 1,000; polyoxypropylene adducts of lower polyhydric alcohols having 2–3 hydroxyl groups, which adducts are terminally oxyethylated and have a molecular weight of at least 1,000; adducts of both ethylene oxide and propylene oxide on lower alkylene polyamines, said adducts having a molecular weight of at least 1,000; and adducts of both ethylene oxide and propylene oxide on lower polyhydric alcohols having 2–3 hydroxyl groups, said adducts having a molecular weight of at least 1,000, and thereafter separating the water from the petroleum oil.

7. The process of claim 6 wherein the dicarboxy acid esters are esters of both said oxyalkylated partial esters of pentaerythritols and said polyoxyethylene, polyoxypropylene glycols.

8. The process of claim 6 wherein the dicarboxy acid esters are esters of both said oxyalkylated partial esters of pentaerythritols and said oxyethylated castor oil.

9. The process of claim 6 wherein the dicarboxy acid esters are esters of both said oxyalkylated partial esters of pentaerythritols and said terminally oxyethylated, polyoxypropylene adducts of lower alkylene polyamines.

10. The process of claim 6 wherein the dicarboxy acid esters are esters of both said oxyalkylated partial esters of pentaerythritols and said terminally oxyethylated, polyoxypropylene adducts of lower polyhydric alcohols having 2–3 hydroxyl groups.

11. The process of claim 6 wherein the dicarboxy acid esters are esters of both said oxyalkylated partial esters of pentaerythritols and said oxyethylated monoalkyl phenol-formaldehyde condensation products.

12. The process of claim 6 wherein the dicarboxy acid esters are esters of both the oxyalkylated partial esters of pentaerythritols and said oxyethylated monoalkyl phenol-formaldehyde-lower alkylene polyamine condensation products.

13. The process of claim 6 wherein the dicarboxy acid esters are esters of both said oxyalkylated partial esters of pentaerythritols and said lower alkylene polyamines adducted with both ethylene oxide and propylene oxide.

14. The process of claim 6 wherein the dicarboxy acid esters are esters of both said oxyalkylated partial esters of pentaerythritols and said lower polyhydric alcohols having 2–3 hydroxyl groups adducted with both ethylene oxide and propylene oxide.

15. In a process for breaking naturally-occurring crude oil petroleum emulsions of the water-in-oil type, adding to said emulsions an amount in the range of one part per 2,000 to 50,000 parts of the emulsion of dicarboxy acid esters, wherein essentially all of the carboxy groups of the dicarboxy acids are esterified with two polyhydroxy lower alkylene oxide adducts of organic compounds, said adducts each having a molecular weight of at least 1000, and at least 20% by weight of said adducts being oxyalkylated, monocarboxylic acid, partial esters of pentaerythritols, said monocarboxylic acid selected from the group consisting of monocarboxylic resin acids, monocarboxylic fatty acids of 12–36 carbons, and mixtures thereof, at least one of the hydroxyl groups of said pentaerythritols being esterified with said monocarboxylic acids and at least two of said hydroxyl groups being polyoxyalkylated with alkylene oxides selected from the group consisting of propylene oxide and mixtures of ethylene oxide and propylene oxide wherein the propylene oxide constitutes at least 50% by weight of the oxide mixture, said oxyalkylated, partial esters having a molecular weight in excess of 1000, the remainder of said adducts being members selected from the group consisting of terminally oxyethylated polyoxypropylene glycols wherein the polyoxypropylene glycol nuclei have a molecular weight of at least 1200 and not exceeding 3500 and have 2–20 mols of adducted ethylene oxide per mol of polyoxypropylene glycol; polyoxyethylene, polyoxypropylene glycols having a molecular weight of 1200–3500 in which said glycol molecule is composed of a heterogeneous mixture of oxyethylene and oxypropylene groups in which the weight ratio of oxyethylene to oxypropylene does not exceed 4:1; oxyethylated castor oil having a molecular weight in the range of 1400 to 3500; oxyalkylated castor oil which is oxyalkylated with both ethylene oxide and propylene oxide in a weight ratio of 1:1 to 10:1, respectively, said oxyalkylated castor oil having a molecular weight in the range of 1500 to 3600; oxyethylated monoalkyl phenol-formaldehyde condensation products in which the alkyl group of the phenol has up to 15 carbon atoms, said alkyl phenol-formaldehyde condensation product having 3–15 phenolic nuclei per molecule, the weight ratio of ethylene oxide to alkyl phenol-formaldehyde condensation products being in the range of 1:2.5 to 2.5:1, respectively; oxyethylated, oxypropylated monoalkyl phenol-formaldehyde condensation products in which the alkyl group of the phenol has up to 15 carbon atoms, said alkyl phenol-formaldehyde condensation product having 3–15 phenolic nuclei per molecule, the weight ratio of the oxyethylene and oxypropylene groups to the monoalkyl phenol-formaldehyde condensation product being in the range of 2:3 to 2.5:1; oxyalkylated condensation products of the monoalkyl phenol-formaldehyde, and a lower alkylene polyamine containing about 4–15 phenolic nuclei per resin molecule, the oxyalkylene groups being a member selected from the group consisting of oxyethylene, oxypropylene, and both oxyethylene and oxypropylene, the weight ratio of the oxyalkylene groups to the monoalkylene phenol-formaldehyde condensation product being in the range of 2:3 to 10:1, respectively; polyoxypropylene adducts of lower alkylene polyamines, which adducts are terminally oxyethylated and have a molecular weight of at least 1,000; polyoxypropylene adducts of lower polyhydric alcohols having 2–3 hydroxyl groups, which adducts are terminally oxyethylated and have a molecular weight of at least 1,000; adducts of both ethylene oxide and propylene oxide on lower alkylene polyamines, said adducts having a molecular weight of at least 1,000; and adducts of both ethylene oxide and propylene oxide on lower polyhydric alcohols having 2-3 hydroxyl groups, said adducts having a molecular weight of at least 1,000, and thereby break the emulsion, and thereafter separating the water from the crude oil.

16. In processes for removing water-soluble salts from petroleum oils, intimately mixing petroleum oils containing water-soluble salts with small amounts of water and thereby dissolving said salts in the water, and breaking the water-in-oil emulsions resulting from said mixing of water and petroleum oil by subjecting said emulsions to the action of one part per 2,000-50,000 parts of the emulsion of dicarboxy acid esters, wherein essentially all of the carboxy groups of the dicarboxy acids are esterified with two polyhydroxy lower alkylene oxide adducts of organic compounds, said adducts each having a molecular weight of at least 1000, and at least 20% by weight of said adducts being oxyalkylated, monocarboxylic acid, partial esters of pentaerythritols, said monocarboxylic acid selected from the group consisting of monocarboxylic resin acids, monocarboxylic fatty acids of 12-36 carbons, and mixtures thereof, at least one of the hydroxyl groups of said pentaerythritols being esterified with said monocarboxylic acids and at least two of said hydroxyl groups being sequentially polyoxyalkylated with first propylene oxide and then ethylene oxide at a mol ratio not exceeding nine mols of ethylene oxide per mol of propylene oxide so that the polyoxyethylene groups are terminally positioned on the polyoxyalkylene radicals, the weight of ethylene oxide added being at least equal to the weight of the propylene oxide added, the molecular weight of the oxyalkylated, partial esters being greater than 1000, the remainder of said adducts being members selected from the group consisting of terminally oxyethylated polyoxypropylene glycols wherein the polyoxypropylene glycol nuclei have a molecular weight of at least 1200 and not exceeding 3500 and have 2-20 mols of adducted ethylene oxide per mol of polyoxypropylene glycol; polyoxyethylene, polyoxypropylene glycols having a molecular weight of 1200-3500 in which said glycol molecule is composed of a heterogeneous mixture of oxyethylene and oxypropylene groups in which the weight ratio of oxyethylene to oxypropylene does not exceed 4:1; oxyethylated castor oil having a molecular weight in the range of 1400 to 3500; oxyalkylated castor oil which is oxyalkylated with both ethylene oxide and propylene oxide in a weight ratio of 1:1 to 10:1, respectively, said oxyalkylated castor oil having a molecular weight in the range of 1500 to 3600; oxyethylated monoalkyl phenol-formaldehyde condensation products in which the alkyl group of the phenol has up to 15 carbon atoms, said alkyl phenol-formaldehyde condensation product having 3-15 phenolic nuclei per molecule, the weight ratio of ethylene oxide to alkyl phenol-formaldehyde condensation products being in the range of 1:2.5 to 2.5:1, respectively; oxyethylated, oxypropylated monoalkyl phenol-formaldehyde condensation products in which the alkyl group of the phenol has up to 15 carbon atoms, said alkyl phenol-formaldehyde condensation product having 3-15 phenolic nuclei per molecule, the weight ratio of the oxyethylene and oxypropylene groups to the monoalkyl phenol-formaldehyde condensation product being in the range of 2:3 to 2.5:1; oxyalkylated condensation products of the monoalkyl phenol-formaldehyde, and a lower alkylene polyamine containing about 4-15 phenolic nuclei per resin molecule, the oxyalkylene groups being a member selected from the group consisting of oxyethylene, oxypropylene, and both oxyethylene and oxypropylene, the weight ratio of the oxyalkylene groups to the monoalkylene phenol-formaldehyde condensation product being in the range of 2:3 to 10:1, respectively; polyoxypropylene adducts of lower alkylene polyamines, which adducts are terminally oxyethylated and have a molecular weight of at least 1,000; polyoxypropylene adducts of lower polyhydric alcohols having 2-3 hydroxyl groups, which adducts are terminally oxyethylated and have a molecular weight of at least 1,000; adducts of both ethylene oxide and propylene oxide on lower alkylene polyamines, said adducts having a molecular weight of at least 1,000; and adducts of both ethylene oxide and propylene oxide on lower polyhydric alcohols having 2-3 hydroxyl groups, said adducts having a molecular weight of at least 1,000.

References Cited in the file of this patent

UNITED STATES PATENTS

| | | |
|---|---|---|
| 2,423,364 | Blair et al. | July 1, 1947 |
| 2,500,349 | De Groote et al. | Mar. 14, 1950 |
| 2,549,436 | De Groote et al. | Apr. 17, 1951 |
| 2,554,667 | De Groote | May 29, 1951 |
| 2,562,878 | Blair | Aug. 7, 1951 |
| 2,586,767 | Wilson | Feb. 19, 1952 |
| 2,610,966 | Esposito | Sept. 16, 1952 |
| 2,626,907 | De Groote | Jan. 27, 1953 |
| 2,695,885 | De Groote | Nov. 30, 1954 |
| 2,864,810 | Batdorf | Dec. 16, 1958 |
| 2,950,313 | Kirkpatrick | Aug. 23, 1960 |